Aug. 26, 1958   L. B. ELLIS ET AL   2,849,264
PISTON STRUCTURE

Filed Sept. 12, 1955   2 Sheets-Sheet 1

INVENTOR
Lockwood B. Ellis &
George C. Trevorrow
BY
L. D. Burch
ATTORNEY

INVENTOR
Lockwood B. Ellis &
George C. Trevarthen
BY
L. D. Burch
ATTORNEY

United States Patent Office 2,849,264
Patented Aug. 26, 1958

2,849,264
PISTON STRUCTURE

Lockwood B. Ellis, Birmingham, and George C. Trevarthen, Farmington, Mich., assignors to General Motors Corporation, Detroit, Mich., a corporation of Delaware Application September 12, 1955, Serial No. 533,642

6 Claims. (Cl. 309—11)

This invention relates to pistons for engines and has particular relation to aluminum pistons especially applicable for large bore, short stroke, high compression ratio, high speed, internal combustion engines for automotive and other uses.

As the bore of engines becomes larger and the stroke shorter, it becomes more difficult to construct aluminum pistons that are strong enough to endure the service required of pistons in high compression ratio, high speed, internal combustion engines. Aluminum pistons must be constructed so that the supporting walls thereof are flexible enough to permit the pistons to change in shape as the pistons expand in cylinders of cast iron. In order to construct such flexible pistons, it has been the practice heretofore to terminate the supporting walls at the pin bosses or to provide supporting rings below the pin bosses that are separated from the pin bosses. It has also been customary to provide separately formed balancing weights inwardly of the pin bosses or elsewhere around the inner edges of the supporting wall of a piston, these supporting weights being adapted to be cut away to any extent required for balancing the pistons and for making the pistons of equal weight.

It is now proposed to construct the supporting wall of an aluminum piston inwardly of the pin bosses as far as the wall may be extended without projecting beyond the inner extremity of the cylinder and to form balancing weights inwardly of the pin bosses and integrally with respect to the pin bosses and the parts of the supporting wall extending inwardly of the pin bosses. The balancing weights may be removed by cutting the metal from the inner ends thereof with a cutting tool rotating about the axis of the piston or of the cylinder in which the piston may be employed.

Figure 2 is taken substantially in the planes of line 2—2 on Figure 1 looking in the direction of the arrows thereon.

Figure 3 is taken in the plane of line 3—3 on Figure 1 looking in the direction of the arrows thereon.

Figure 1:
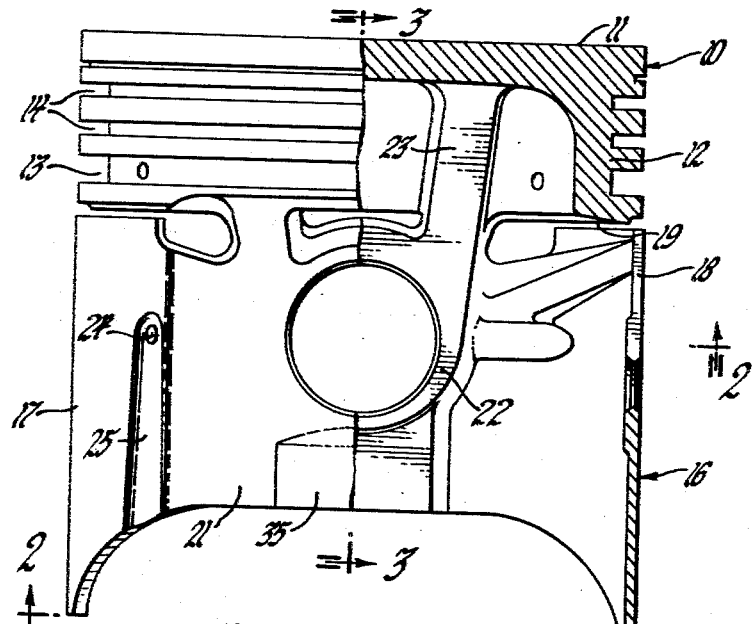
Figure 1 is a side elevational view of a piston embracing the invention, with one side of the piston cut away and shown in cross section to better illustrate the interior construction of the piston.
Figure 2:
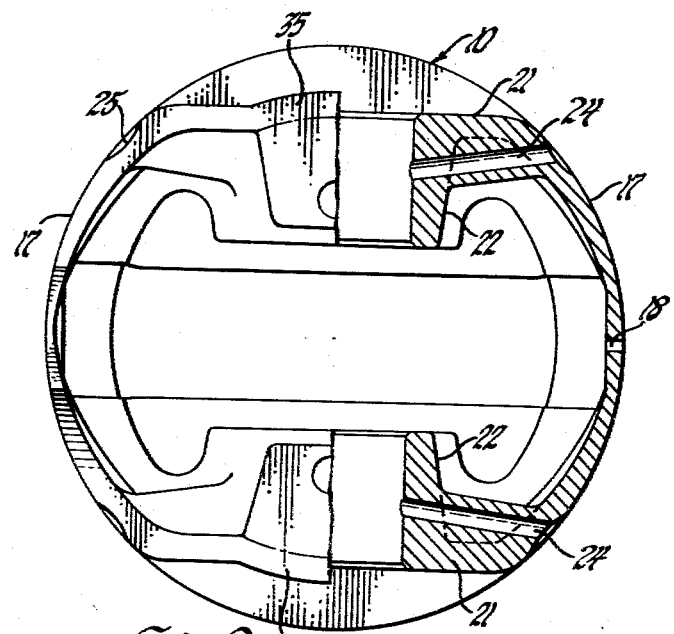
Figure 2 is a plan view of the inner end of the piston shown by Figure 1, with one side of the piston cut away and shown in cross section to better illustrate the interior construction of the piston.

The piston 10 embracing the invention may be constructed to provide a piston head 11 having a ring flange 12 extending inwardly of the piston and at one side of the head 11. The ring flange may be grooved as indicated at 13 to provide for one or more oil rings and as indicated at 14 to provide for one or more compression rings.

Projecting inwardly of and at one side of the piston head 11 is a supporting wall 16 which is adapted to extend around the piston for supporting the piston head. The supporting wall 16 may be provided with oppositely disposed bearing walls 17 for slidably engaging the cylinder surface within which the piston may be required to operate. The supporting wall 16 forming the bearing walls 17 is usually constructed to be relatively thin and flexible and slots such as are indicated at 18 may be formed axially of the piston to provide additional flexibility in the bearing walls 17. Transverse slots such as those indicated at 19 are usually cut between the ring flange 12 and the upper extremities of the bearing walls 17 to permit the bearing walls 17 to change in shape with respect to the ring flange 12 and without distorting the ring flange 12.

The supporting wall 16 also may be formed to provide oppositely disposed side walls 21 formed integrally with and extending between the bearing walls 17. In the present instance, the side walls extend substantially chordally across the opposite sides of the piston 10 and between the opposite edges of the bearing walls 17. Extending transversely across and formed integrally with the side walls 21 are pin bosses 22 which are adapted to receive a piston pin for supporting the piston 10. The pin bosses 22 in the present instance project inwardly with respect to the inner surfaces of the side walls 21 to provide sufficient bearing for the piston pin employed.

Integral piers 23 are provided for supporting the head 11 upon the pin bosses 22 and the side walls 21 of the supporting wall 16. The pin bosses 22 may be lubricated by employing passages 24 that lead to the inner surfaces of the pin bosses from channels 25 that may be formed in the outer surfaces of the bearing walls 17 and leading from the inner extremities of the bearing walls 17.

Figures 3, 4:
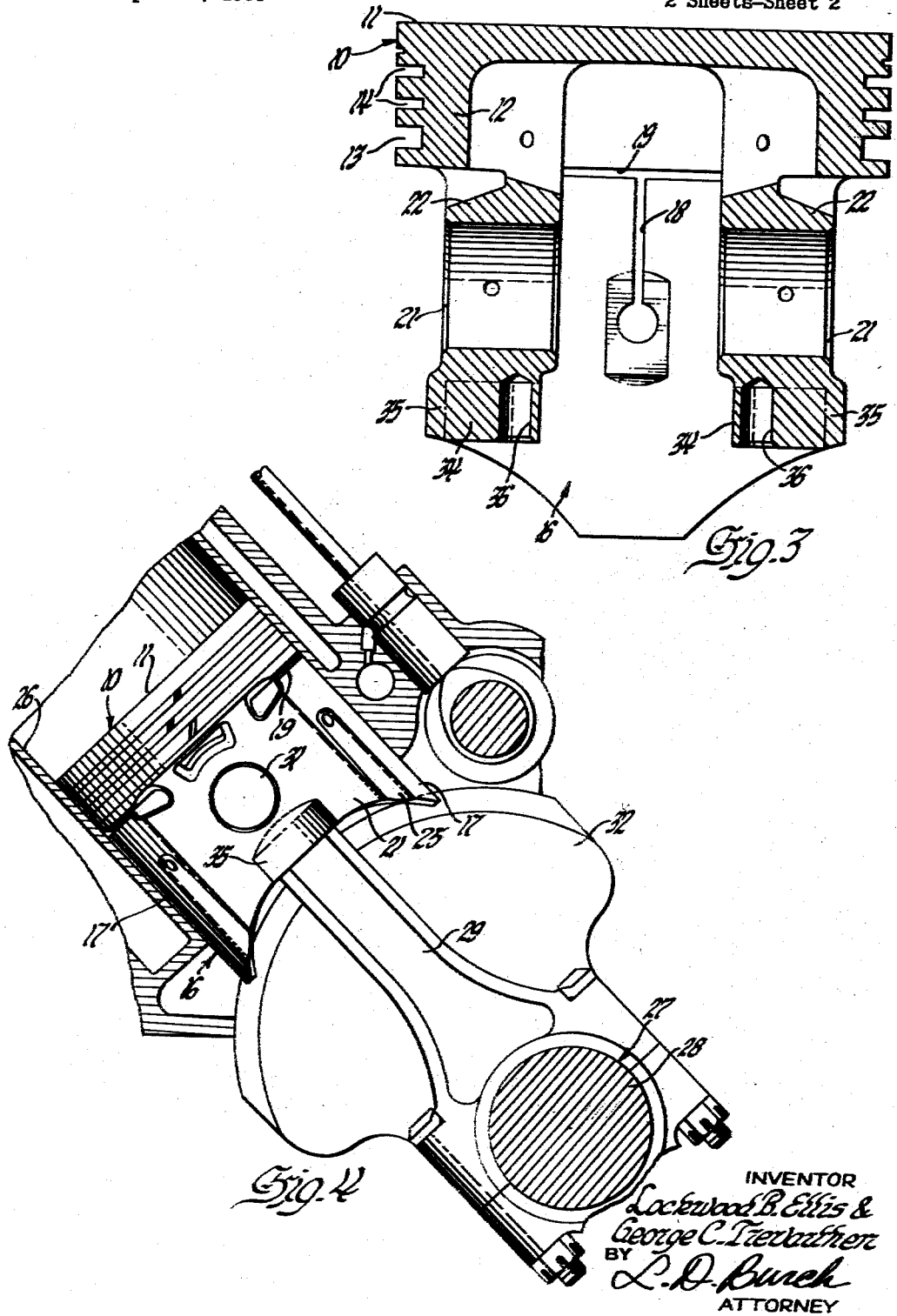
Figure 3 is a longitudinal sectional view through the piston disclosed by Figures 1 and 2.
Figure 4 is a fragmentary transverse sectional view through an internal combustion engine employing a piston embracing the invention as illustrated by Figures 1–3.

The piston 10 may be employed in a cylinder 26 of an internal combustion engine such as that partially illustrated by Figure 4. The piston may be operated by a crankshaft 27 having a crank pin 28 adapted to be connected to the piston 10 by a connecting rod 29. A piston pin 31 may be employed in the pin bosses 21 for connecting the piston 10 to the inner end of the connecting rod 29. Counterweights such as that indicated at 32 are usually required for the smooth operation of high speed, internal combustion engines. The counterweight 32 is illustrated in Figure 4 in the outer dead center position which the piston 10 may occupy in the cylinder 11. It will be apparent that the counterweight 32 must rotate without engaging the inner extremity of the cylinder 26. However, it is desirable in constructing engines of this kind to have the counterweight rotate as near as possible to the inner extremity of the cylinder 26 without engagement therewith.

The piston 10, which is illustrated in Figure 4 in the inner dead center position of the piston with respect to the cylinder 26, is constructed in such a way that the inner edges of the side walls 21 will terminate substantially in the plane of the inner end of the cylinder 26. The side walls 21 are formed to extend inwardly of the pin bosses 22 to this extent. It is also desirable to provide as much bearing surface as is possible on the bearing walls 17. Toward this end the bearing walls 17 are adapted to slope inwardly at the inner extremities thereof as is indicated in Figure 3. The inner extremities of the bearing walls 17 may extend inwardly of the inner extremities of the side walls 21 and the cylinder 26 when the piston 10 is at inner dead center position in the cylinder 26 and without engaging the counterweights 32. The counterweights rotate on opposite sides of the cylinder and will rotate between the inwardly projecting parts of the bearing walls 17. However, the counterweights rotate in directly opposed relation to the inner extremities of the side walls 21 so that the side walls 21 cannot project inwardly of the cylinder 26 in the inner dead center position of the piston in the cylinder.

The extremities of the side walls 21 projecting inwardly of the pin bosses 22 are formed integrally with respect to the pin bosses 22 and with respect to balancing weights 34 that are required in the manufacture of pistons. The balancing weights project axially inwardly with respect to the piston pin bosses 22 and radially inwardly with respect to the inwardly extending parts of the side walls 21. It is proposed to curve the outer surfaces of the side walls 21 radially outwardly of the balancing weights 34 about the axis of the piston 10 and in such manner that the balancing weights 34 may be cut away in any desired manner about the axis of the piston 10. This may be done without reducing the thickness of the parts of the side walls 21 that extend inwardly of the pin bosses after the balancing weights are cut away. When the balancing weights 34 are cut away, the side walls inwardly of the pin bosses form arcuate supports 35 for the pin bosses 22 and the side walls 21. The arcuate supports 35 may be of substantially uniform thickness and substantially of the same thickness as other parts of the side walls 21, thus making the side walls as extensive and strong as possible for supporting the pin bosses 22 from the inwardly extending parts of the bearing walls 17. The balancing weights 34 may be bored as indicated at 36 to facilitate holding the piston while various surfaces thereof are finished and prior to the removal of the metal forming the balancing weights 34.

We claim:

1. A piston comprising a head and a supporting wall extending at one side of and inwardly of said head when said piston is disposed in a cylinder of an internal combustion engine, said supporting wall being formed to extend around said piston and within said head and to engage said cylinder for supporting said piston, said supporting wall being formed to provide oppositely disposed side walls having oppositely disposed pin bosses formed therein for operating said piston within said cylinder, means associated with said head and said pin bosses and said side walls for supporting said head upon said pin bosses and said side walls, and balancing weight means formed on opposite sides of said piston and projecting inwardly of said pin bosses and within said side walls and formed integrally with respect to said pin bosses and the extremities of said side walls inwardly of said pin bosses and throughout the radial and axial extent of said pin bosses and said extremities.

2. A piston as defined by claim 1 and in which said balancing weight means and the inner extremities of said side walls terminate in a plane extending transversely with respect to the axis of said cylinder.

3. A piston as defined by claim 1 and in which said side walls radially outwardly of said balancing weight means are formed to provide arcuate surfaces formed about the axis of said cylinder to provide side walls of uniform thickness about the spaces in which said balancing weight means are formed and after said bosses are removed by cutting said balancing weight means inwardly about said axis of said cylinder.

4. A piston comprising a head and a supporting wall extending at one side of and inwardly of said head when said piston is disposed in a cylinder of an internal combustion engine, said supporting wall being formed to extend around said piston and within said head and to engage said cylinder for supporting said piston, said supporting wall being formed to provide oppositely disposed side walls having pin bosses formed therein for operating said piston within said cylinder, means associated with said head and said pin bosses and said side walls for supporting said head upon said pin bosses and said side walls, said side walls being formed to provide arcuate supports extending inwardly of said pin bosses and in spaced relation to said cylinder and having arcuate interior and exterior surfaces formed concentrically about the axis of said cylinder and concentrically inwardly of the cylinder engaging surfaces of said supporting wall, said arcuate interior surfaces of said supports being radially within all other peripheral surfaces of said supporting wall within the axial extent of said arcuate interior surfaces.

5. A piston as defined by claim 4 and in which the inner edges of said arcuate supports extend inwardly of said pin bosses as far as the inner end of said cylinder, when said piston is at inner dead center position within said cylinder.

6. A piston as defined by claim 4 and in which balancing weight means is formed inwardly of said pin bosses and integrally with said arcuate supports, said balancing weight means being positioned to be removed to any desired extent and inwardly of said inner edges of said arcuate supports and by cutting said balancing weight means about the axis of said cylinder.

References Cited in the file of this patent

UNITED STATES PATENTS

| | | |
|---|---|---|
| 1,758,444 | Jehle et al. | May 13, 1930 |
| 1,763,523 | Jardine | June 10, 1930 |
| 2,120,019 | Cooper | June 7, 1938 |
| 2,177,574 | Malina | Oct. 24, 1939 |
| 2,705,667 | Fahlman et al. | Apr. 5, 1955 |